INVENTOR
William A. Hill
ATTORNEY

April 27, 1948.  W. A. HILL  2,440,336
ENGINE BRAKING APPARATUS
Filed Oct. 3, 1945  2 Sheets-Sheet 2
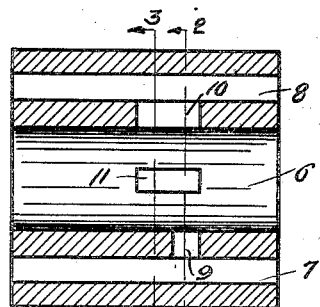
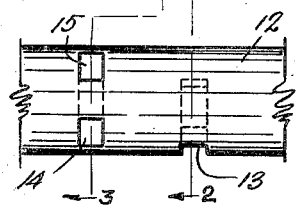
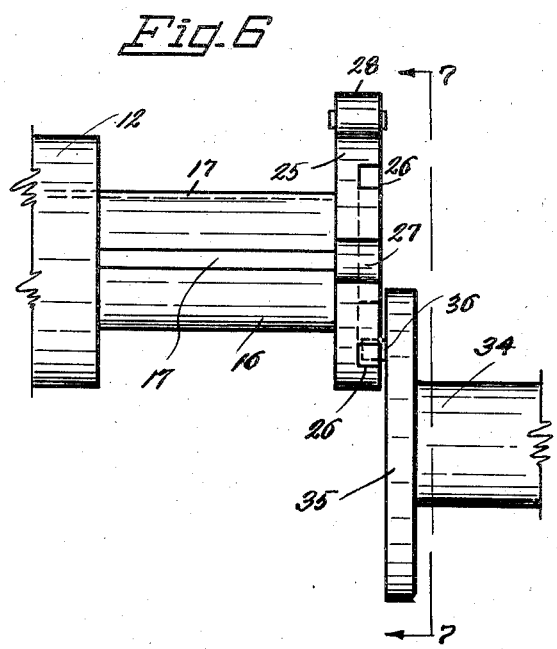
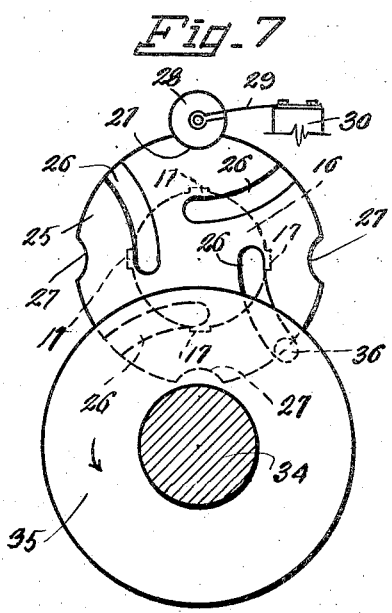
INVENTOR
William A. Hill
BY
ATTORNEY Patented Apr. 27, 1948

2,440,336

UNITED STATES PATENT OFFICE 2,440,336

ENGINE BRAKING APPARATUS

William A. Hill, Spokane, Wash.

Application October 3, 1945, Serial No. 620,097

7 Claims. (Cl. 123—97)

This invention relates to an internal combustion engine and it is one object to provide an engine with an improved valve construction having ports so formed and arranged that by proper adjustment of the valve mechanism the engine may be operated as a power plant or employed as a brake for checking movement of an automobile or operation of any other apparatus powered by the engine.

Another object of the invention is to provide the engine with valve mechanism so formed that a valve member rotatably mounted in a cylindrical valve chamber may be longitudinally shifted to adjusted positions and very effectively control the speed of the engine and also cause braking action to be applied gradually.

Another object of the invention is to provide a valve which is very easy to adjust and move to a power or brake applying position or may be shifted to such position that neither power or braking action will be in effect.

Another object of the invention is to provide an engine with an improved power and brake valve which is simple in construction and not liable to get out of order and fail to operate properly.

The invention is illustrated in the accompanying drawings wherein:

Fig. 4 is a sectional view taken longitudinally through the valve casing, the view being along line 4—4 of Figure 3.

Fig. 5 is a side elevation of the valve member which operates in the cylindrical valve chamber shown in Figure 4.

Fig. 6 is a view upon an enlarged scale illustrating the manner in which rotary movement is intermittently imparted to the valve member.

Fig. 7 is a view taken along the line 7—7 of Figure 6.

Figure 1:
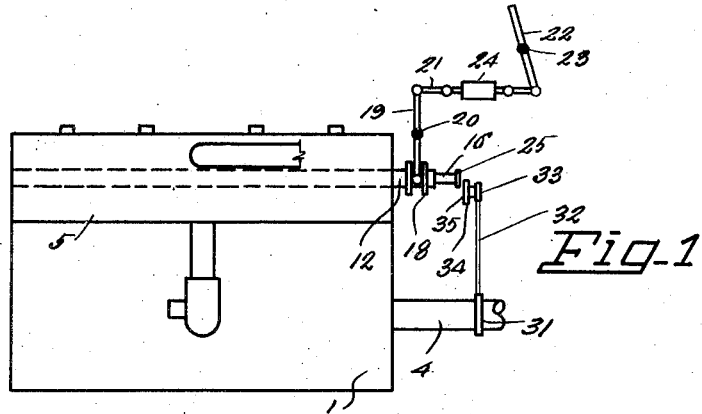
Fig. 1 is a side view of an engine equipped with the improved valve mechanism.

The engine which is indicated in general by the numeral 1 is an internal combustion engine and has the usual cylinder bank over which is mounted a head block 2 formed with cylindrical chambers 3 corresponding in number to cylinders of the body or bank of the engine and registering therewith. The usual crank shaft 4 projects from one end of the engine, and a piston 3' operates in each cylinder. A side extension 5 extends along the head 2 at one side of the engine and is bored to form a cylindrical valve chamber 6 and also formed with longitudinally extending intake and exhaust manifolds 7 and 8 communicating with the valve chamber through ports 9 and 10. A port 11 connects each cylinder with the valve chamber and upon referring to Figure 4 it will be seen that while the ports 10 and 11 are of the same length, the port 9 is of appreciably less length than the ports 10 and 11.

A valve member 12 which is circular in cross section fits snugly in the chamber 6 and since the same valve member controls all of the cylinders it is provided for each cylinder with a circumferentially extending groove or port 13 and crossed ports 14 and 15 which are spaced from the port 13 longitudinally of the valve member a distance greater than the length of the port 10 and the port 11. The width of the port 13 is the same as the length of the port 9. This may be clearly seen by an inspection of Figures 4 and 5.

The valve member is bored from one end to receive a shaft 16 and is keyed to the shaft 16 by longitudinally extending keys 17 so that while the valve member may be shifted longitudinally of the shaft 16 it will turn with this shaft. A collar 18 is carried by the valve member and engaged by the forked lower end of a lever 19 and this lever is pivoted at 20 and has its upper end pivoted to a rod 21 which has its other end pivoted to a foot pedal 22 pivoted at 23 so that the lever may be rocked to shift the rod longitudinally and tilt lever 19 to cause the valve member to be shifted longitudinally to adjusted positions. A centering spring of conventional form is mounted in a casing 24 through which the rod 21 passes and yieldably holds the rod in a normal position.

At its outer end the shaft 16 carries a disk 25 having its outer face formed with grooves 26 which are spaced from each other equal distances circumferentially of the disk and arcuate longitudinally as shown in Figure 7. Since the engine is a four cycle engine four of these grooves 26 have been provided. The shaft and the valve member are to be intermittently turned a quarter revolution and in order to control the turning movements of the shaft the disk is formed about its periphery with recesses 27 to receive a roller 28 carried by an arm 29 formed from a strip of resilient sheet metal and projecting from a support 30. Rotary motion is transmitted to the shaft 16 from the crank shaft 4 of the engine, and upon referring to Figure 1 it will be seen that the crank shaft carries a pulley 31 about which is engaged a belt or chain having its upper portion trained about a pulley 33 carried by a shaft 34 which is rotatably mounted in suitable manner and carries a disk 35. The shaft 34 makes two revolutions for each revolution of the crank shaft. The disk 35 overlaps the lower portion of the disk 25 and at a point about its circumference carries a pin 26 which projects from the disk 35 in the direction of disk 25 and during rotation of disk 35 will successively enter the grooves 26 from outer ends thereof and impart quarter revolutions to the shaft 16, the pin then passing out of the groove and entering the following groove upon reaching position to do so.

Figure 2:
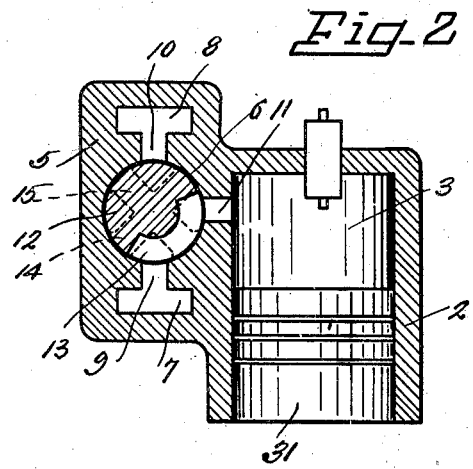
Fig. 2 is a sectional view taken vertically through an engine cylinder and showing the valve in position to serve as a fuel valve.

When the engine is in operation the valve member is shifted longitudinally to a position disposing the circumferentially extending passage 13 in position for alternately establishing communication between the cylinder port 11 and the inlet and exhaust ports 9 and 10 as the valve member turns. Figure 2 shows the piston in position for flow of fuel into the cylinder above the piston. Upon completion of the downward stroke of the piston the valve member makes a quarter turn and the passage 13 moves out of registry with the cylinder port and the piston then moves upwardly in a compression stroke. As the piston reaches the top of the cylinder the valve member makes a second quarter turn, the cylinder port being closed by the valve member, and the charge is fired to move the piston downwardly in a power stroke. When the piston reaches the limit of its downward movement the valve member makes a third quarter turn to cause the passage 13 to register with the cylinder port and the exhaust port 10 and the piston then moves upwardly in a scavengering stroke and burned fuel is driven out through the exhaust manifold. The valve member then makes a fourth quarter turn to return to the position of Figure 2 and the piston may move downwardly and draw in another charge of fuel from the manifold 7.

Figure 3:
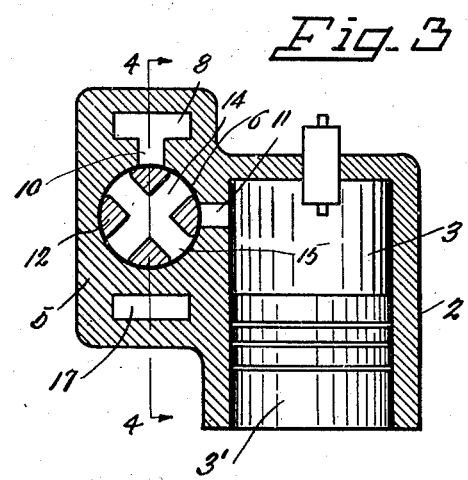
Fig. 3 is a view similar to Figure 2 showing the valve shifted to a position in which it serves as a brake valve.

When it is desired to use the engine as a brake for checking movement of a motor vehicle the valve member is shifted longitudinally to the position shown in Figure 3 and in this position the inlet port will be closed in all positions of rotary movement of the valve member but the passages 14 and 15 will successively move into and out of registry with the cylinder port 11 and the exhaust port 10 as the valve member is intermittently turned. During the rest periods of the valve member the cylinder port 11 is closed, as shown in Figure 3, and as the piston moves downwardly in the cylinder it works against atmospheric pressure. Upon reaching the lower extremity of its downward movement the valve member in making a quarter turn, momentarily connects the cylinder port with the exhaust port and this allows relief of the partial vacuum in the cylinder. The cylinder is filled with an inert charge of air from the exhaust manifold and the port 11 again closed so that the piston will move upwardly against action of the air trapped in the cylinder. Upon the piston reaching the upper end of its travel the valve member again makes a quarter turn and as the passages 14 and 15 again allow momentary communication between the cylinder port and the exhaust accumulated pressure in the upper portion of the cylinder will be relieved. The succeeding downward stroke of the piston is again made against external pressure. This alternating employment of the cylinder as a vacuum pump and as a compressor provides a very effective braking action.

Movement of the foot pedal 22 towards the left of Figure 1 moves the valve member longitudinally to a position in which it acts as a fuel valve and movement of the pedal toward the right shifts the valve member longitudinally to a position in which it acts as a brake valve. The centering springs in the casing 24 normally hold the valve in position for idling and restore it to this position when pressure upon the pedal is removed.

Having thus described the invention, what is claimed is:

1. In an internal combustion engine, a cylinder, a piston operating in said cylinder, a crank shaft, a valve chamber at a side of said cylinder having inlet and exhaust ports and a port communicating with the cylinder, the inlet port being of less length longitudinally of the valve chamber then the exhaust port and the cylinder port, a valve member rotatably mounted in said valve chamber and slidable longitudinally therein to adjusted positions, said valve member being formed with a fuel passage extending circumferentially thereof for alternately establishing communication between the cylinder port and the inlet port and the exhaust port during rotation of the valve member in one position of longitudinal adjustment, the valve member being also formed with passages spaced from the fuel passage longitudinally of the valve member a distance greater than the length of the exhaust port and the cylinder port and extending diametrically through the valve member when the valve member is slid longitudinally to crossed relation to each other and intermittently establishing communication between the cylinder port and the exhaust port during rotation of the valve member in another position of longitudinal adjustment, means for intermittently transmitting rotary motion from the crank shaft to the valve member, and means for shifting the valve member longitudinally to adjusted positions.

2. In an internal combustion engine, a cylinder, a piston operating in said cylinder, a crank shaft, a valve chamber extending along the engine at a side of the cylinder and having an inlet port and an exhaust port spaced from each other circumferentially of the valve chamber and a cylinder port between the said inlet and exhaust ports, a combined power valve and brake valve rotatably mounted in said chamber and shiftable longitudinally therein, said valve being formed with a fuel passage for alternately establishing communication between the cylinder port and the inlet port and the exhaust port during rotation of the valve in one position of longitudinal adjustment, the valve being also formed with ports for controlling braking action of the engine shiftable by longitudinal adjustment of the valve into and out of position for intermittently establishing communication between the cylinder port and the exhaust port during rotation of the valve, means for shifting said valve longitudinally to adjusted positions, and means for transmitting rotary motion from the crank shaft to the valve.

3. In an internal combustion engine, a cylinder, a piston operating therein, a valve chamber at one side of said cylinder having a cylinder port and circumferentially spaced inlet and exhaust ports, a valve rotatable in said valve chamber and shiftable longitudinally therein, said valve having passages movable by longitudinal adjustment of the valve into and out of position for intermittent communication with the cylinder port and the inlet and exhaust port during rotation of the valve, the valve in one position of longitudinal adjustment constituting a fuel valve and in another position of longitudinal adjustment constituting means for controlling braking action of the engine.

4. In an internal combustion engine, a cylinder, a valve chamber having inlet and exhaust ports and a cylinder port, a valve in said valve chamber having a circumferentially extending passage and diametrically extending passages spaced from the circumferentially extending passage longitudinally of the valve, means for rotating the valve back and forth in timed relation to rotation of the crank shaft of the engine to intermittently move the passages into and out of communication with the ports of the valve chamber, and means for moving the valve longitudinally in the valve chamber to adjusted positions for selectively disposing its passages in position for intermittently registering with the ports during rocking movement of the valve.

5. In an internal combustion engine, a cylinder, a valve chamber having inlet and exhaust ports and a cylinder port, and a valve member in the valve chamber formed with passages for controlling communication between the cylinder port and the inlet and exhaust ports, the valve member being shiftable from a position allowing operation of the engine as a power plant to a position allowing operation of the engine as a brake.

6. In an internal combustion engine, a cylinder, a valve chamber communicating with the cylinder through a cylinder port and having an inlet port and an exhaust port, and a valve constituting means for controlling communication between the cylinder port and the inlet and exhaust ports and shiftable from a position serving as a power valve to a position for serving as a brake valve.

7. In an internal combustion engine, a cylinder, a piston operating in said cylinder, a crank shaft, a valve chamber at one side of said cylinder having a cylinder port and inlet and exhaust ports, a valve member rotatable in said valve chamber and formed with passages for intermittently registering with the ports during rotation of the valve member, means for shifting the valve member longitudinally to move selected passages into operative relation to the ports, a drive shaft keyed to the valve member for permitting longitudinal shifting of the valve member, a disk carried by the drive shaft and having a side face formed with arcuate grooves spaced from each other circumferentially of the disk and leading from its periphery, a second disk rotatably mounted and having a portion overlapping the grooved face of the first disk, a pin projecting from the second disk for successively engaging in the grooves and intermittently rotating the first disk and the valve member during rotation of the second disk, and means for transmitting rotary movement from the crank shaft to the second disk.

WILLIAM A. HILL.

REFERENCES CITED

The following references are of record in the file of this patent:

UNITED STATES PATENTS

| Number | Name | Date |
|---|---|---|
| 2,156,560 | Bachmann | May 2, 1939 |